May 28, 1957 D. ARRAS 2,793,414
HOSE CLAMP
Original Filed Oct. 20, 1954 2 Sheets-Sheet 1
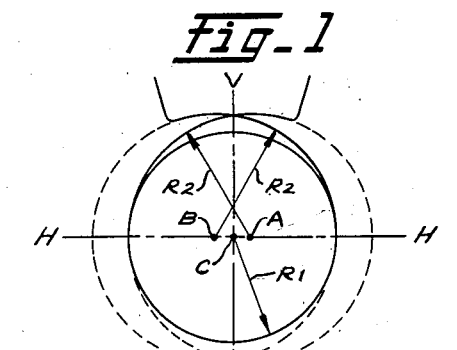
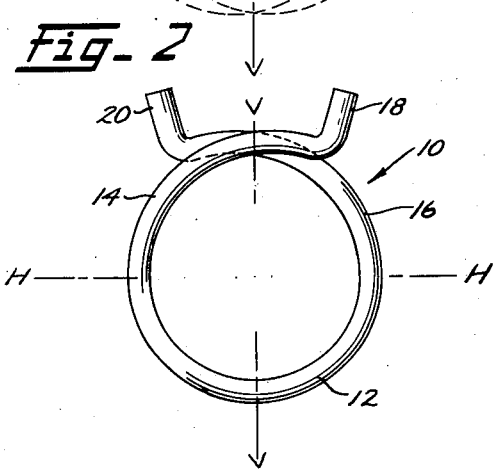
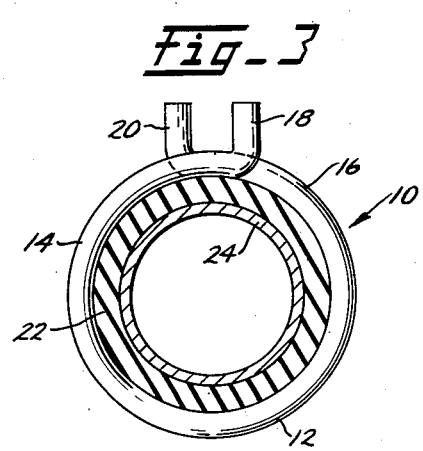
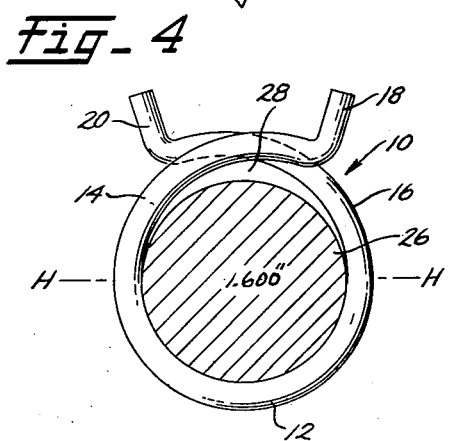
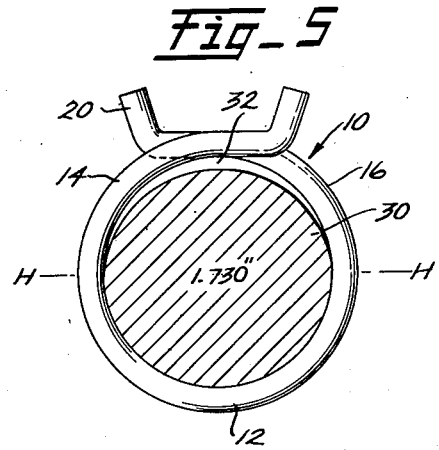
INVENTOR.
DAMIANO ARRAS
BY Roger B. McCormick
ATTORNEY May 28, 1957  D. ARRAS  2,793,414
HOSE CLAMP
Original Filed Oct. 20, 1954  2 Sheets-Sheet 2
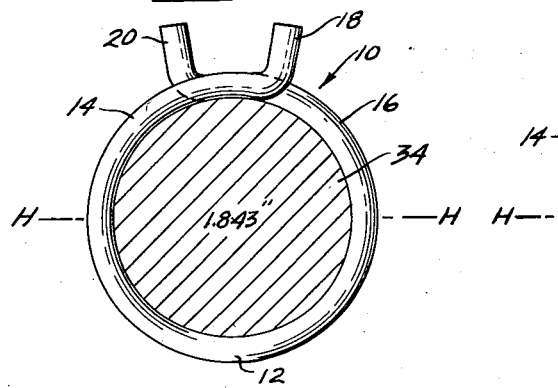
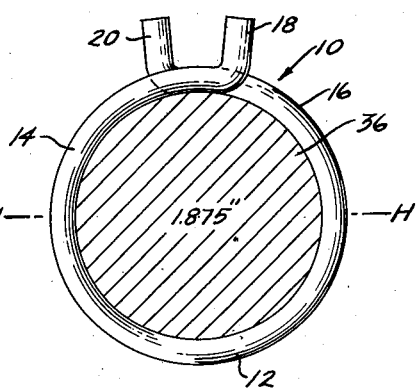
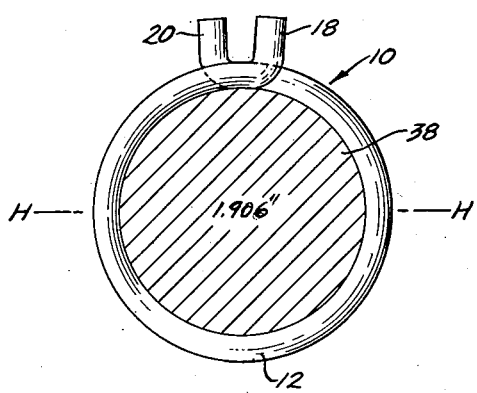
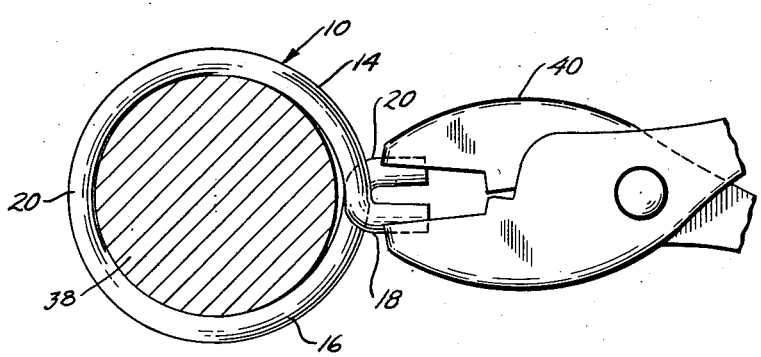
INVENTOR.
DAMIANO ARRAS
BY Roger B. McCormick
ATTORNEY

United States Patent Office 2,793,414
Patented May 28, 1957

2,793,414

HOSE CLAMP

Damiano Arras, New Britain, Conn.

Continuation of application Serial No. 463,453, October 20, 1954. This application January 25, 1956, Serial No. 561,260

2 Claims. (Cl. 24—27)

This invention relates to hose clamps and, more particularly, to a self-tightening or self-contracting hose clamp of the general type shown in my United States Patent 2,180,271, issued November 14, 1939. This application is a continuation of my application Serial No. 463,453 entitled Hose Clamp, filed October 20, 1954, now abandoned.

It is the general object of this invention to provide a self-tightening or self-contracting, spring-wire type hose clamp which will form a substantially perfect circle at a predetermined or design diameter and which will apply clamping force around the circle when placed on a hose or other article of the said design diameter and which can also be applied to hoses and other articles which vary to a limited extent from the design diameter.

The foregoing object and other objects and advantages of the invention will become apparent to those skilled in the art from the following description taken in connection with the accompanying drawings which, by way of preferred example only, illustrate one specific embodiment of the invention and in which, Fig. 1 is a diagrammatic view illustrating the manner in which the hose clamp of this invention is formed;

Fig. 2 is a view of a hose clamp constructed in accordance with the present invention, showing the clamp in fully contracted position;

Fig. 3 is a view of the hose clamp in application as used to secure a hose to a rigid tube or pipe;

Fig. 4 shows the hose clamp as applied to an object of less diameter than the hose shown in Fig. 3;

Fig. 5 is a view of the hose clamp in place on an object having a diameter greater than the object shown in Fig. 4 but less than the diameter of the hose shown in Fig. 3;

Fig. 6 shows the hose clamp in place and embracing an object greater in diameter than the object shown in Fig. 5 but less than the diameter of the hose shown in Fig. 3;

Fig. 7 is similar to Fig. 3 showing the hose clamp embracing an object of equal diameter to the hose in Fig. 3;

Fig. 8 shows the hose clamp embracing an object of greater diameter than the hose shown in Fig. 3; and Fig. 9 shows the hose clamp and a tool for expanding the same for the purpose of placing the hose clamp over a hose or other circular article.

As set forth in my aforementioned patent and as also mentioned in the Golden Patent No. 2,685,719, self-tightening or self-contracting hose clamps of this general type are formed of a length of wire stock which is spring-tempered after being formed as a band on a diameter less than the diameter of the hose or other object to be clamped. Then, in application of the clamp, it is expanded and placed around the hose and then released so that its inherent spring force will contract the clamp upon the hose to secure the same to a metal tube or pipe or the like. In the manufacture of hose clamps of this type, it has always been an object to have the clamp apply substantially uniform force around the circle of predetermined diameter. While some degree of success has marked the efforts of hose manufacturers, it has been difficult to provide a hose clamp which, when expanded to embrace a hose of known diameter, will approach a perfect circle on the hose and will apply uniform force therearound.

In accordance with the present invention, there is provided a hose clamp which will more closely approach a perfect circle when applied at a predetermined diameter and which will apply substantially uniform forces around the circle of predetermined diameter and which clamp can also be used to embrace a hose or other object which may vary in diameter from the predetermined or design diameter.

The hose clamp as shown in Figs. 2 to 8 of the drawings is generally similar in appearance to the hose clamp shown in my aforementioned patent. That is, the clamp 10 comprises a length of wire having a substantially circular cross section and which is formed as a band having a lower body portion 12 and an upper body portion comprising two parti-circular arms 14 and 16 which are extensions of the lower body portion 12. The arms 14 and 16 cross each other at the top of the band in a vertical plane which substantially intersects the band. The arms 14 and 16 have projecting ends 18 and 20 which are provided for the convenient application of a tool adapted to expand the wire band. It should be understood that the projecting ends 18 and 20 can be provided in various forms other than shown without departing from the invention. It should also be understood that terms such as "top," "bottom," "vertical," etc. are used for convenience in describing and defining the invention with reference to the drawings, and such terms are not meant to limit the invention, it being understood that the clamp can be positioned otherwise than shown in the drawings.

For further convenience in describing the invention and for furthering the understanding thereof, there is shown in Fig. 1 a diagrammatic layout for forming a wire band to provide a hose clamp 10 designed for optimum efficiency when applied at a predetermined diameter of 1.875". The 1.875" diameter will hereinafter be referred to as the design diameter of the particular clamp 10 shown in the drawings.

As previously mentioned, it is highly desirable to provide a hose clamp which will form a substantially perfect circle when in clamped engagement with a hose of a diameter for which the clamp is designed. Obviously, the clamp must encircle or embrace less than the design diameter when free in order for it to be self-tightening when applied at the design diameter. In the manufacture of the hose clamp of this invention, the clamp is initially formed on two different radii. That is, the lower semi-circular portion 12, or that portion below a horizontal plane H—H as indicated in Figs. 1 and 2, is formed on a radius which is less than one-half of the predetermined or design diameter which the hose clamp is particularly adapted to meet. The upper portion of the clamp which comprises the two arms 14 and 16 which intersect in a vertical plane V—V as shown in Figs. 1 and 2 is formed on a radius which is substantially equal to one-half of the predetermined or design diameter.

More specifically, the lower semi-circular body portion 12 of the clamp is formed on a radius $R_1$ from a center C residing in the horizontal plane H—H wherein the radius $R_1$ is less than one-half of the design diameter. The arms 14 and 16 which comprise extensions of the lower semi-circular portion 12 are formed on equal radii $R_2$, $R_2$ extending from centers A and B located substantially in the horizontal plane H—H. The arms 14 and 16 are formed to extend a substantial distance beyond their point of intersection.

The lower body portion or semi-circular portion 12 of the clamp may be referred to as the power section which offers the greatest resistance to expansion of the wire band or clamp, but this power section must be enlarged or partially straightened in enlarging the clamp to fit a hose or the like. The resistance to enlargement provides the embracing or clamping force of the clamp. By forming the lower or power section of the clamp at less than the design diameter and the upper arms on design radii, the clamp will form a substantially perfect circle when enlarged to embrace a hose of the design diameter. In other words, substantially all of the radial enlargement in fitting the clamp at the design diameter takes place within the lower section. That is, when the ends 18 and 20 of the arms are drawn toward each other, the power section 12 is spread so that its enlarged radius substantially equals the radius of the arms 14 and 16 to form a substantially perfect circle at the design diameter. Before the clamp is enlarged to fit an object of the design diameter, it is only generally circular and embraces less than the design diameter as best shown in Figs. 1, 2 and 4. The clamp can be enlarged beyond design diameter and will still maintain substantially circular configuration as shown in Fig. 8.

The selection of the precise radius $R_1$ in forming the lower portion 12 of the clamp will vary somewhat with the weight of the wire used in forming the clamp or band. That is, the spring force of the wire will vary with the weight of the wire and make it necessary to select a radius $R_1$ in keeping with the weight of the wire used. It has been found that a hose clamp can be formed in accordance with the present invention by forming the lower portion thereof on a radius $R_1$ which will fall within the range of 30% to 45% of the design diameter. If relatively heavy wire is used in the manufacture of the clamp, the radius $R_1$ will approach the upper limit of the stated range and in the use of lighter wire, the radius $R_1$ will approach the lower limit of the range. In the particular hose clamp shown in the accompanying drawings, the radius $R_1$ is approximately equal to 42.5% of the predetermined or design diameter. Since the design diameter is 1.875 inches, the lower portion of the clamp is initially formed on a radius of approximately .800 inch.

It will be apparent that the band which is formed in the aforedescribed manner will initially have a semi-circular bottom portion 12 and a generally elliptical top portion comprising the crossed arms 14 and 16. Having formed the band in the manner described, it is then treated or tempered in accordance with known practice so that it will have an inherent spring force tending to return the band to the aforedescribed shape after it has been expanded.

The hose clamp 10 as shown in Fig. 2 was formed in accordance with the aforedescribed plan and is shown in the contracted position it will assume by spring force when no forces are applied tending to expand the same.

The same clamp is shown in Fig. 3 as applied to a hose 22 to secure the hose in telescoping relationship around a metal tube or pipe 24. It is important to observe that the hose clamp 10 has been expanded to embrace the hose 22 in a substantially perfect circle having a diameter of approximately 1.875". In forming a substantially perfect circle around the hose 22, the lower or power section 12 resists the enlargement so as to tend to draw the arms 14 and 16 inwardly thereby applying substantially uniform force around the hose. It should also be observed that the projecting ends 18 and 20 are brought into closer relationship when the clamp 10 is expanded.

In expanding the clamp 10 to a substantially perfect circle of the said predetermined diameter, the ends 18 and 20 are engaged by a tool and forced towards each other. This causes a greater portion of the arms 14 and 16 to be used in forming the circle. That is, a part of the extending portion of each of the said arms is thrust past the cross over point in the vertical plane V into the wire band. However, the arms 14 and 16 are not spread to any material extent, all material spreading taking place in the power section 12. When the clamp is enlarged, the arms 14 and 16 merely swing apart like hinges, but the arms per se are not spread. At the same time, the bottom portion 12 of the band is spread slightly so that the entire band or clamp assumes circular configuration on a center which varies in position from the center C. The newly located center of the expanded clamp will fall in the vertical plane above the point C and the bottom body portion 12 and the arms 14 and 16 will be re-formed or re-located on substantially equal radii extending from the newly located center point.

Figs. 4, 5 and 6 illustrate the change which takes place in the opening of the hose clamp 10 as the same is expanded to embrace the hose 22. More specifically, in Fig. 4, the clamp 10 is shown in its spring-biased or non-expanded position around a circular object 26 having a diameter of 1.600". It will be observed that the lower body portion 12 of the clamp 10 snugly embraces that portion of the object 26 below the horizontal plane H. It will also be observed that the arms 14 and 16 form the upper body portion of the clamp 10 in generally elliptical configuration and do not snugly embrace the object 26 whereby a substantial gap or clearance 28 is defined above the said object and below the crossing point of the arms 14 and 16.

In Fig. 5, the clamp 10 is shown in partly-expanded condition embracing a circular object 30 having a diameter of approximately 1.730". In this application of the clamp 10, the lower body portion 12 continues to snugly embrace that portion of the object 30 below the horizontal plane H—H, while the arms 14 and 16 comprising the upper body portion of the clamp are still generally elliptical and do not snugly embrace that portion of the object 30 above the plane H. However, it will be observed that the gap or space 32 below the crossing point of the arms 14 and 16 is substantially less than the gap 28 shown in Fig. 4 and that the upper portion of the clamp is becoming more circular in configuration.

In Fig. 6, the clamp 10 is shown further expanded and embracing a circular object 34 having a diameter of approximately 1.843". In this application of the clamp 10, the lower body portion 12 snugly embraces the lower half of the object 34 and the arms 14 and 16 have formed a substantially circular upper body portion which snugly embraces the upper half of the circular object 34. It has been found that in applying the clamp 10 to an object 34 having a diameter approximately .030" less than the design diameter, the said clamp will be substantially circular and will embrace the entire periphery of the object and apply substantially uniform gripping force therearound.

In Fig. 7, the clamp 10 is shown as applied to an object 36 having a diameter of approximately 1.875" (the design diameter). In this application of the clamp 10, the lower body portion 12 and the arms 14 and 16 all snugly embrace the said object in a substantially perfect circle and it has been found that the gripping forces are most uniform around the said object.

As shown in Fig. 8, the clamp 10 can be applied around an object 38 of greater diameter than the design diameter and will still embrace the same substantially uniformly therearound. The particular object 38 shown has a diameter of approximately 1.906" and it will be observed that the clamp 10 continues to provide substantially perfect circular gripping therearound.

Accordingly, it can be said that a clamp constructed in accordance with the present invention, i. e., having a lower body portion formed as a semi-circle on a radius less than one-half of design diameter and preferably within the range of 30% to 45% of design diameter and having an upper body portion comprising crossed-over arms formed as left and right-side extensions of the lower body portion on radii substantially equal to design radii will provide clamp means for an object of design diameter and for circular objects which may vary in diameter to a limited extent from the design diameter.

It will be readily understood that the aforedescribed clamp can be easily and expeditiously applied by an expanding tool 40 constructed in accordance with U. S. Patent 2,677,982 and which comprises a pair of pliers having jaws particularly adapted to engage the projecting ends 18 and 20 of the clamp. In the use of a tool 40, the clamp can be safely held and expanded for application over a hose or other circular object and then released so that the inherent spring force will cause the clamp to contract on the hose or other object to firmly engage the same. In Fig. 9 I have shown the tool 40 engaging the clamp 10 and expanding the same so that it can be disengaged from the object 38. It should be noted that the arms 14 and 16 are spread, or act as hinges when engaged by the tool, to afford the greatest clearance adjacent the crossing point of the said arms. At the same time the portion 12 of the clamp 10 is also spread very slightly so that the clamp can be moved relative to the said object.

The invention claimed is:

1. A self-tightening hose clamp for application for a predetermined diameter and comprising a length of wire formed as a resilient band having a bottom semi-circular body portion formed on a radius of less than one-half of the said predetermined diameter and extending from a center lying in a horizontal plane, and said band having a top body portion comprising a pair of similar parti-circular arms formed as extensions of the bottom body portion on radii substantially equal to one-half of the said predetermined diameter and extending from centers lying in the said horizontal plane, the said arms being constructed and arranged to cross each other in a vertical plane intersecting the said bottom body portion and to extend a substantial distance beyond said vertical plane.

2. A self-tightening hose clamp for application at a predetermined diameter and comprising a length of wire formed as a resilient band having a bottom semi-circular body portion formed on a radius within the range of approximately 30% to approximately 45% of the said predetermined diameter and extending from a center lying in a horizontal plane, and said band also having a top body portion comprising a pair of similar parti-circular arms formed as extensions of the bottom body portion on radii which substantially equal 50% of the said predetermined diameter and extending from centers lying in the said horizontal plane, the said arms being constructed and arranged to cross each other in a vertical plane which substantially intersects the said bottom body portion and which arms extend beyond the said vertical plane.

References Cited in the file of this patent

UNITED STATES PATENTS

| 899,217 | Hetherington | Sept. 22, 1908 |
| 2,180,271 | Arras | Nov. 14, 1939 |
| 2,685,719 | Golden | Aug. 10, 1954 |

FOREIGN PATENTS

| 1,059,971 | France | Nov. 18, 1953 |